Dec. 26, 1967 L. R. REDFERN 3,359,653
TRIGONOMETRIC TEACHING DEVICE
Filed Sept. 3, 1965 2 Sheets-Sheet 1
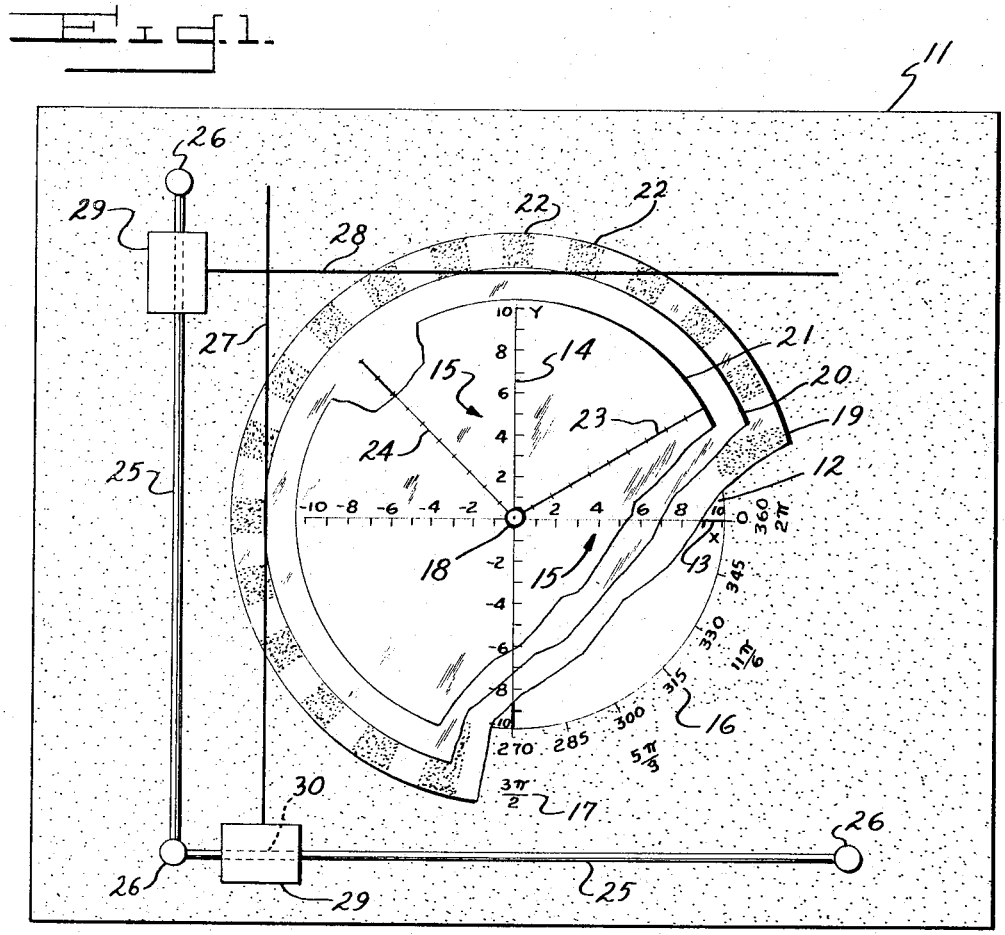
Fig. 1.
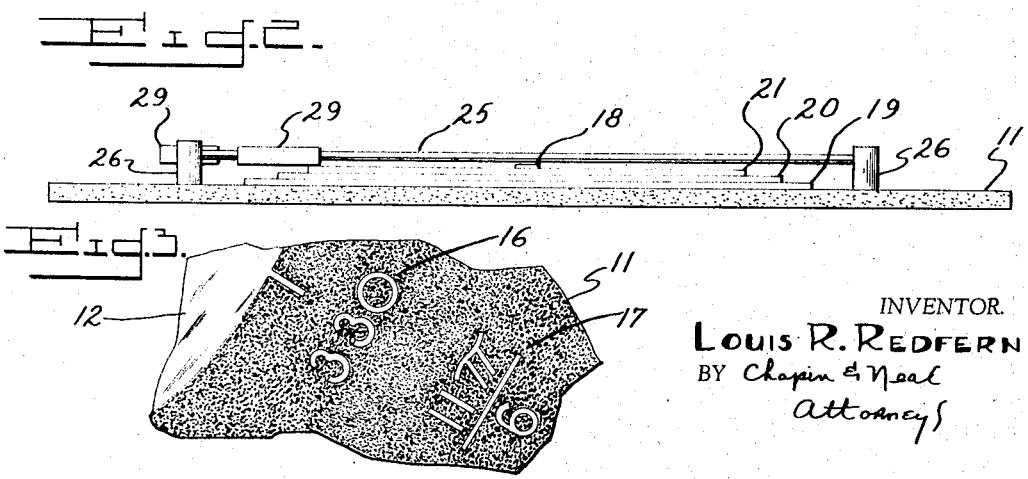
Fig. 2.
Fig. 3.
INVENTOR.
LOUIS R. REDFERN
BY Chapin & Neal
Attorneys

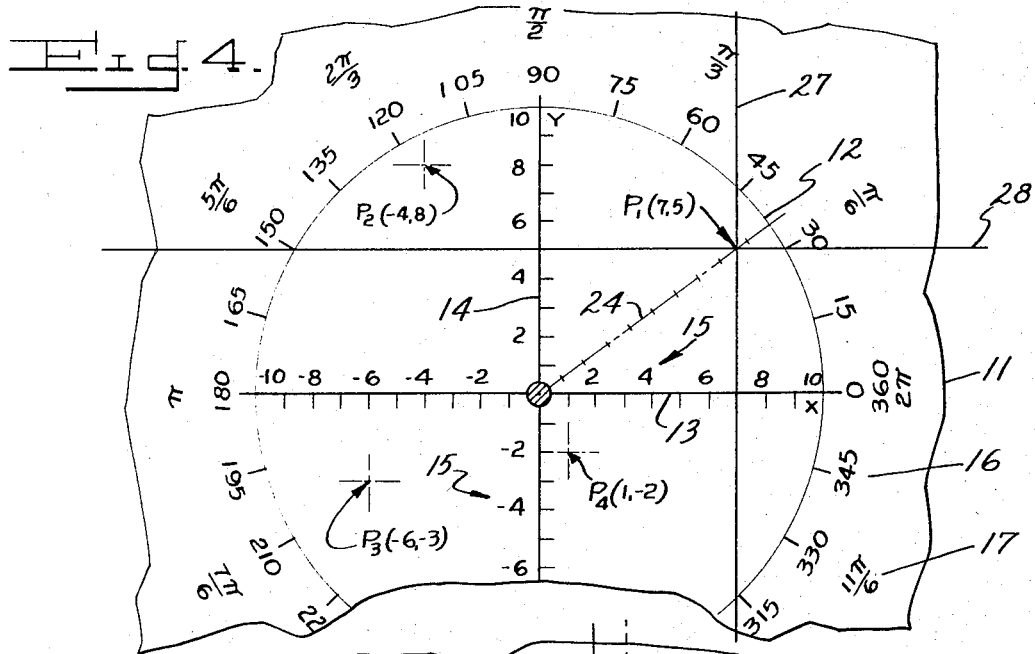

United States Patent Office 3,359,653
Patented Dec. 26, 1967

3,359,653
TRIGONOMETRIC TEACHING DEVICE
Louis R. Redfern, Chicopee, Mass., assignor to Tecnifax Corporation, Holyoke, Mass., a corporation of Massachusetts
Filed Sept. 8, 1965, Ser. No. 485,823
3 Claims. (Cl. 35—34)

ABSTRACT OF THE DISCLOSURE

A trigonometric teaching device for use with overhead projection equipment. The device comprises a base member having a circular transparent portion which is graduated with rectangular coordinates and angular calibrations. The device is further comprised of transparent overlays rotatably mounted at the center of the transparent circular portion of the base, and horizontal and vertical coordinate locating indicating rods slidably disposed on the base.

---

In recent years visual teaching aids, programmed study material and course material for projection have become important in the field of education. The overhead projector is an ideal tool for use as a teaching aid, since the teacher can demonstrate concepts and illustrate his lecture and other course material. Ordinarily this is done with transparencies which may have various diagrams and image portions for use by the instructor to construct a composite image by selectively superimposing projection overlays on a basic image or outline. While these projection techniques are excellent, there are certain courses and basic concepts which require repeated illustration, drilling, and problem solving by students both as a group and individually. One object which is best taught by drilling in problems is mathematics, particularly in the primary and secondary school levels.

The principal object of this invention is to provide a teaching aid for use with overhead projection which is ideally suited for instruction in basic trigonometry.

Another object of this invention is to provide a projection teaching aid useful in conveying to students the concepts of trigonometric functions, rectangular coordinates and polar coordinates.

A further object of this invention is to provide a dynamic teaching device capable of projecting images movable to illustrate numerous problems, thereby eliminating the need for repetitive chalkboard illustration of individual problems, graphs and grids, and thereby expedite the learning process.

Still another important object of my invention is to provide a teaching aid of simple construction and ease of operation so that teachers and students may use the device after minimum instruction.

Other objects and advantages of this invention will become more apparent from the following description, which is to be considered together with the accompanying drawings, in which:

FIG. 1 is a plan view of the trigonometric teaching device constructed in accordance with the invention, portions being broken away to show details of construction;

FIG. 2 is an elevational view of the device illustrated in FIG. 1;

FIG. 3 is an enlarged section of the degree and radian calibrations shown in FIG. 1, showing the transparent nature of said calibration; and FIGS. 4 and 5 are views illustrating some of the uses to which the device may be put.

Referring to the drawings in detail, and in particular to FIGS. 1 and 2, the device embodying this invention comprises a base 11. The base may be made of any suitable sheet material, including a suitable synthetic plastic such as cellulose acetate, polyethylene, polypropylene and the like. Preferably the material is provided with transparent and opaqued areas to enable projection of images onto a screen when the device is used with an overhead projector.

As shown, the base has at its center a transparent circular area 12, the remainder being sufficiently opaque to block projection of light. The base is imprinted with an X-axis 13 and Y-axis 14. It will be observed that both axes 13 and 14 are opaque lines within the transparent circular area 12. Equally spaced graduations 15 are also imprinted along both the X and X axes.

The circular area of the base 11 is graduated, such as shown at 16, from 0° to 360°, in 15° increments. In addition, radian calibrations 17 are provided from 0 to $2\pi$ radians, one located radially outwardly of every other degree graduation whereby they are spaced 30° apart. As can be seen in FIGS. 1 and 3, the degree and radian graduations are located outward of the transparent circular area 12, and are transparent so that they are projected onto the screen when used with an overhead projector.

At the intersection of the X and Y axes in the center of the circle 12, a pivot pin 18 is provided for rotatably receiving a plurality of overlays 19, 20, and 21. The overlays are in the form of circular discs disposed on pin 18 in superposed relation and are of decreasing diameter from the base outwardly. This arrangement facilitates ease of rotation of each overlay independently of the others.

The innermost overlay 19 comprises a sheet of transparent sheet material with circumferentially spaced radially disposed opaqued sectors 22. The sectors are provided to mask and unmask selectively for projection the degree and radian calibrations 16 and 17 disposed about the perimeter of the circle 12.

The other overlays or discs 20 and 21, also rotatably mounted on the pin 18, are formed of transparent sheet material whereby the X and Y axes can be projected therethrough. On each of these disc overlays there are opaqued radially extending lines 23 and 24, respectively. These lines can be independently moved to various angles while permitting light to be transmitted or projected therethrough, whereby the axes and circumferential graduations may be projected on a screen together with the radius lines 23 and 24.

The base 11 is also provided with means for indicating and locating by rectangular coordinates any point within the transparent circular area 12. As shown, the point locating means comprises two indicator filaments, rods or wires movable in mutually perpendicular relation across the transparent center portion 12. Each rod is mounted for movement parallel to the X and Y axes 13 and 14, respectively.

As shown, each of the rods is movable along a slideway in the form of a rod 25 disposed parallel to the X and Y axes and supported at its outer end by posts or support members 26 which extend upwardly of the base 11. Each of the rods 27 and 28 extend outwardly of a carrier 29 slidably disposed on the guide rods 25. As shown, the carrier may be a block of suitable material having a bore 30 which receives the rod 25. The block may be a suitable plastic with low coefficient of friction, whereby it is easily slid along the rod 25 with its underside in contact with the upper surface of the base 11. The indicator rods 27 and 28 are supported by the carriers 29 a sufficient height above the surface of the base 11 so that they clear the overlays and pivot pin or hub 18 when slid back and forth in the guide rods 25.

The following examples are given by way of explanation as to operation of the teaching device embodying this invention.

In FIG. 4 is illustrated the use of the device to teach coordinates, a basic tenet of trigonometry. It involves the association of pairs of numbers to two mutually-perpendicular lines called coordinate axes. In general usage, the horizontal axis is called the abscissa or X-axis and the vertical axis is called the ordinate or Y-axis with their intersection at point zero being designated the origin. It is understood that as usual, in any coordinate system, vertical and horizontal measurements, above and to the right, respectively, of the point of origin are considered positive, while similar measurements below and to the left of the point of origin are designated negative.

In the light of the above, when pairs of numbers are given such as $P_1(7, 5)$, $P_2(-4, 3)$, $P_3(-6, -3)$ and $P_4(1, -2)$, the first digit of the pair is always located along the X-axis while the second digit is located on the Y-axis. In the case of $P_1(7, 5)$, if a line is drawn parallel to the Y-axis, intersecting 7 on the X-axis, we then know $P_1(7, 5)$ lies somewhere along that line. To find exactly where, we need but construct a similar line parallel to the X-axis intersecting 5 on the Y-axis. From this construction $P_1(7, 5)$ is seen to lie at the intersection of the two construction lines.

By the use of my device, the same concept is illustrated and projected onto a screen by the use of the following procedure:

The teaching aid is placed on the stage of an overhead projector which is focused to clearly project the various graduations provided on the device. The point $P_1(7, 5)$ is located by sliding the rod or indicator 27 along its line guide 25 until it intersects 7 on the X-axis 13. The indicator rod may be readily moved by sliding block 29, with the fingers, along rod 25. The indicator rod 28 may then be similarly manipulated by sliding block 29 along guide rod 25 until the rod 28 lines up with 5 on the Y-axis. To find Point $P_1(7, 5)$ is thus located at the intersection of the two line indicator rods 27 and 28. This entire procedure, step-by-step would have been projected onto the screen for the students. Any other point may be similarly located so that it intersects the intersection of the two line indicators 27 and 28.

The conversion to polar coordinates may be illustrated by projection onto a screen by positioning one of the radius lines 23 or 24 so as to intersect the coordinate defined by intersection of indicator rods 27 and 28. Thus, in FIG. 4, with radius 24 positioned as shown, the class can be shown that a radial distance or vector of about 8.6, 35° are the polar coordinates corresponding to rectangular coordinates $P_1(7, 5)$.

The device may also be used to illustrate various trigonometric functions including determination of a particular angle. If we accept cot $\theta = .325$, by a basic knowledge of the derivation of angles, it is known that the cotangent of an angle equals the adjacent side or abscissa distance divided by its opposite side or ordinate distance, i.e., cot $\theta = x/y$ as shown in FIG. 5. With this in mind we need only select an arbitrary value, such as 2 for the abscissa and substitute same for X in the equation. The equation thus reads cot $\theta = 2/y = .325$, and by solving the same, the ordinate is found to equal 6.15 or slightly greater than 6.

Referring now to FIG. 5, the same problem may be worked out by the following procedure:

(a) Set the vertical line indicator 27 so that it intersects 2 on the X-axis; this locates the adjacent side of the angle $\theta$;
(b) Then set the horizontal line indicator 28 so that it intersects 6.15 on the Y-axis in order to locate the opposite side of the angle $\theta$;
(c) Set one of the rotatable radii on overlay disc 20 or 21 so that it intersects the intersection of the two line indicator 27 and 28.

At this point we need but follow the radius 23 or 24 to the point where it intersects the circumference of the circle 12 to find the approximate angle in question (72°) from the degree calibrations imprinted about the perimeter of the circle 12.

(d) Now, leaving the radius 23 or 24 in place, the horizontal line indicator 28 may be set at the point where said radius intersects the circumference of the circle 12 and also set the vertical line indicator 27 so that it intersects the point where the radius intersects the circumference of the circle 12.

We are now able to read the sine value at the point where the horizontal line indicator 28 intersects the Y-axis 14 as .95 and the cosine value as .31 at the point where the vertical line indicator 27 intersects the X-axis 13.

Of course, it will be appreciated that the other trigonometric functions including reciprocal co-functions can be illustrated using the device embodying this invention.

Thus, the trigonometric functions of a known angle may be determined through the use of this device; for example, where the known angle is 72° the six functions of the angle are:

sine = .95         sec = 3.24         tan = 3.08
cos = .31          csc = 1.05         cot = .325

It should be noted, in this example, that as the degree 16 and radian 17 calibrations located about the perimeter of the circle 12 come into use, they may selectively be masked and unmasked, such as for illustrating problems of solving for an angle from two known sides of a triangle. Thus for example, the students may be asked to state the various trigonometric relationships of a triangle formed using indicator rods 27 and 28 and the radius lines 23 and 24. For example, with the disc 19 rotated to mask the degree calibrations 16 in FIG. 5, the class might be asked to determine angle $\theta$ from its adjacent side 2 and its opposite side 6. Thus tangent approximately $$\frac{6.2}{2} = 3.1$$

or approximately 72°. Having allowed a student or class as a group to make this calculation the disc 19 would then be rotated exposing the degree calibrations whereby the radius line 24 indicates the correct answer. The students can then veryfy their solution to the problem.

It should also be noted in relation to problem solving that angles can be located in any quadrant of the device at the point where the radius intersects the circumference of the transparent circle 12.

Negative angles may be illustrated using the device embodying this invention. Thus, one is able to determine the functions of negative angles in terms of functions of positive angles with great ease and speed.

The above specification has described a new and improved device for illustrating, teaching and solving innumerable trigonometric problems by projecting them on a screen while permitting the instructor to actively manipulate polar and rectangular coordinates and various trigonometric functions while the students are observing the dynamic image projected on the screen. It is realized that the disclosure may indicate to others different ways of utilizing the principles involved in this invention without departing from the spirit thereof, and it is, therefore, intended that this invention be limited only by the scope of the appended claims.

Having thus described the invention, what is claimed is:

1. Projection trigonometric teaching device for use with overhead projectors comprising an opaque base, a transparent circular portion within said base, said transparent circular portion having angular calibrations disposed adjacent its circumference and a coordinate grid system with mutually perpendicular axes, a first rotatable transparent overlay having at least one opaque portion providing a radial coordinate to locate on said grid system a point by polar coordinates, a second rotatable transparent overlay having opaqued sectors equally spaced about its circumference to mask and unmask said angular calibrations for selective projection thereof, when said second overlay is rotated, and rectangular coordinate locating means slidably mounted on said base in mutually perpendicular relation for locating a given point on said grid system.

2. Projection trigonometric teaching device for use with overhead projectors as set forth in claim 1 in which said rectangular coordinate locating means comprising indicator rods, each supported by at least one carrier block slidably disposed on a guideway extending parallel to the axes of the coordinate grid system, said guideway being located on the opaque portion of the base.

3. Projection trigonometric teaching device for use with overhead projectors as set forth in claim 2 in which said carrier is a block having a bore therethrough and said guideway is a rod extending through said bore.

References Cited
UNITED STATES PATENTS

| | | | |
|---|---|---|---|
| 1,442,710 | 1/1923 | Webster | 33—76 |
| 1,836,643 | 12/1931 | Chesham | 35—30 XR |
| 2,841,889 | 7/1958 | Coale et al. | 35—30 XR |
| 3,128,944 | 4/1964 | Gabriel. | |
| 3,137,443 | 6/1964 | Samuelson. | |

EUGENE R. CAPOZIO, *Primary Examiner.*

W. GRIEB, *Assistant Examiner.*